United States Patent [19]

Alderete et al.

[11] 4,047,961

[45] Sept. 13, 1977

[54] CEMENT COMPOSITION

[75] Inventors: William Eugene Alderete, Irving; John Parke Boyer, Dallas; Kenneth Earl Daugherty, Lewisville; David Lee Johnson, Garland, all of Tex.

[73] Assignee: General Portland, Inc., Dallas, Tex.

[21] Appl. No.: 585,659

[22] Filed: June 10, 1975

[51] Int. Cl.² ............................................... C04B 7/14
[52] U.S. Cl. ...................................... 106/89; 106/103; 106/117
[58] Field of Search ........................... 106/103, 117, 89

[56] References Cited

U.S. PATENT DOCUMENTS

| 3,565,648 | 2/1971 | Mori et al. | 106/117 |
| 3,582,377 | 6/1971 | Hays et al. | 106/117 |

*Primary Examiner*—J. Poer
*Attorney, Agent, or Firm*—Richards, Harris & Medlock

[57] ABSTRACT

A cement of the same general characteristics of a normal Type I is provided which involves the intergrind of from 1 up to about 25 parts by weight of air-cooled iron blast furnace slag, and from over 75 up to 99 parts by weight of conventional Type I Portland clinker. Traditional set control additives, particularly such as sulfate provided through gypsum, are used in the new cement composition. It is particularly noted that the slag involved is air-cooled, as contrasted to an amorphous material obtained by water quenching. In some respects the new product is better than traditional Type I, and can thus be referred to as an improved Type I.

13 Claims, No Drawings

CEMENT COMPOSITION

Type I cements have been around for years and are the most common material of construction in the area of cement usage.

In the past, from time to time, it has been suggested that certain amounts of slag could be added to various cement clinkers in order to intergrind and produce an end product that is a combination of slag and clinker, ground to a fineness to produce a cement material. Normally, gypsum or other sulfate additive has been included. In the prior art, such cements have been normally classified as so-called "slag cements" or "Type I-S". These cements have been treated as inferior for certain purposes to Type I, or at least as not suitable for the uses that Type I finds. The Type I-S has, for example, been thought to give low initial or early strength, compared to traditional Type I, and the blast furnace cements have exhibited properties differing from typical Type I to an even greater degree than Type I-S cement.

A traditional belief in the past has been that slags which are utilized in a cement, regardless of the type cement, are required to be amorphous or glassy in nature. That is to say, it should not have a crystalline structure.

Furnace slags are relatively common and are of course a waste by-product of many industries. It would be most beneficial, in time particularly of an energy shortage, to utilize by-product furnace slag for an important energy and material saving purpose.

If blast furnace slag is cooled rapidly with large amounts of water, a so-called "granulated" slag is said to be produced. This involves rapid chilling or cooling by water (sometimes large amounts of air). In any event, such granulated slags are highly amorphous in nature, and have very little, if any, crystal structure.

On the other hand, air-cooled slags are produced by allowing the slag to cool slowly. Usually, cooling is aided by some water, but such water is added in a ratio of less than 1 (water to slag ratio). The end product of such air cooling processes, whether or not with the addition of small amounts of water to facilitate cooling and to prevent injuries to equipment, is typically of crystalline nature, and can be anticipated to consist of over 50% by weight of a crystalline material.

As used herein, an air-cooled slag is defined as one that is at least 50% by weight crystalline in nature. It is to be contrasted sharply with a granulated slag. Likewise, an air-cooled slag, as so defined, is distinct from so-called "foamed" slags, wherein the slag is treated at an intermediate cooling rate, between the rate of rapid chilling, traditional for water quenching, and the air-cooling method described above. For example, such foam slags are often produced by the introduction of large quantities of steam and/or air into the cooling mass. Foamed slags are, like granulated slags, of a generally amorphous nature, although their crystalline content may often be somewhat higher than granulated slag.

In accordance with the present invention, it has been found that air-cooled slag may be used in up to 25 parts by weight with 75 parts of Portland cement clinker in order to obtain a good cement product. Preferably, the portion of slag is from about to 5 to 15 parts by weight with about 10 parts by weight being most preferred, interground with 85 to 95 parts by weight and 10 parts by weight of Type I clinker, respectively.

Not all air-cooled slags work as well as others. Some produce an excellent product when used as an intergrind with cement clinker, while others do not perform as well. In the present invention, the slag, though air-cooled, is thought to be particularly effective because of is chemical composition and accompanying physical characteristics.

The preferred practice of the present invention utilizes a blast furnace slag which is usable to produce a Type I cement, even when interground in quantities that are most substantial. Indeed, some of the cement characteristics are, in instances, better than those when compared to Type I cement that does not have the slag as a component.

An excellent slag for practice of the present invention is obtained by conducting the slag from the hot furnace of a coke-fired balst furnace making iron into railroad cars having a ladle-like shape. The cars are then run from the furnace area a short distance to where a pit is located. Twenty to thirty such cars at a time are transported to the pit and the ladle cars are dumped to deposit the hot mass into the pit. Thereafter, the layer of slag is sprayed with a small quantity of water to accelerate cooling somewhat. Clearly, the process is one classified as "air-cooled" by all traditional classification methods in the art. The resulting layer is such pit is on the order of 1 inch thick. In due time the process is repeated to dump 20 or 30 additional cars of slag on top of the first layer, and again, a small amount of water spray is provided for the added layer. In time, a substantial depth of slag material is accumulated. When the pit is substantially full, a power shovel loads it into trucks, and it is taken to the cement grinding plant as a slag raw material suitable for practice of the present invention. Interestingly, at the time of the shovel loading, there often are as many as 200 levels or layers of the 1 inch thick material present in the pit.

An approximate analysis of the material obtained from the pit is as follows (by weight):

| | |
|---|---|
| $SiO_2$ | 35.6% |
| $CaO$ | 39.0% |
| $Al_2O_3$ | 8.6% |
| $Fe_2O_3$ | 4.0% |
| $MgO$ | 9.6% |
| Unidentified Miscellaneous | 3.2% |

The above material has a structure that is in excess of 50% by weight of a crystalline nature, and may even exceed 75% by weight of a crystalline nature.

The following examples are illustrative of the utilization of the blast furnace slag of the nature described above in the manufacture of cement in accordance with the present invention:

EXAMPLE I

The air-cooled slag from a blast furnace for iron has the following analysis:

| | |
|---|---|
| $SiO_2$ | 35.6 |
| $CaO$ | 39.0 |
| $Al_2O_3$ | 8.6 |
| $Fe_2O_3$ | 4.0 |
| $MgO$ | 9.6 |

The above identified material was crushed and size graded so that all of it ranged from ¼ inch in ⅜ average diameter (as determined by screening).

The slag material, Type I clinker, and typical additive was fed to a 9.5 inch × 34inch Nordberg ball mill, operated in a 1500 HP closed circuit system. The proportions of material entering the mill were:

Portland cement clinker — 90 No.
gypsum/anhydrite — 5 No.
air-cooled blast furnace slag — 10 No.

The 5 No. of gypsum/anhydrite was a 60 to 40 gypsum anhydrite (gypsum/anhydrite) blend. The gypsum additive serves the function of providing sulfate as a set retarder or set control agent, as is typical in normal Type I cements.

The clinker fed to the mill was of the following composition (on weight % basis):

| Oxide Analysis Basis | | Approximate Bogue Compound Composition | |
|---|---|---|---|
| $SiO_2$ | 21.5 | $C_3S$ | 58 |
| $Al_2O_3$ | 6.1 | $C_2S$ | 18 |
| $Fe_2O_3$ | 3.0 | $C_3A$ | 11 |
| CaO | 65.5 | $C_4AF$ | 0 |
| MgO | 3.7 | | |
| Trace Materials | .2 | | |
| | 100.0% | | |

This clinker was typical in chemical and physical characteristics of that used in the production of normal Type I cement.

The above identified materials were ground (no grinding aid or air entraining agents were used) to obtain a Blaine fineness of 3370 cm$^2$/g and a (−)325 mesh of 89.8%. The chemical analysis of the resultant product was as follows:

| | |
|---|---|
| $SiO_2$ | 22.16 |
| $Al_2O_3$ | 6.32 |
| $Fe_2O_3$ | 2.42 |
| CaO | 61.59 |
| MgO | 3.11 |
| $SO_3$ | 3.24 |
| Undetermined | 1.16 |
| | 100.00% |

For comparative purposes, a normal Type I cement is made of the same clinker described above, with 5 No. of the gypsum/anhydrite added to 100 No. of the clinker. The end product is ground to the same Blaine fineness and same mesh fineness. This normal Type I is compared to the improved Type I made as described above in accordance with the foregoing test of this example.

Comparative normal ASTM tests are made of the two materials, and results are as follows:

| | Normal Type I | Slag/Clinker Combination (Improved Type I) |
|---|---|---|
| Blaine, cm$^2$/g | 3350 | 3370 |
| −325 mesh | 89.8% | 89.8% |
| Setting Times: | (Hrs. & Min) | (Hrs. & Min) |
| Initial | 2:05 | 2:10 |
| Final | 3:45 | 4:00 |
| Autoclave Expansion: | 0.12% | 0.09% |
| ASTM C-109 Strength: | | |
| 1-day, psi | 1850 | 1700 |
| 3-day, psi | 3420 | 3280 |
| 7-day, psi | 4470 | 4340 |
| 28-day, psi | 5400 | 5410 |

EXAMPLE 2

A second air-cooled slag, being substantially the same composition and crystalline nature as that given in Example I above, is ground and sized to pass through a ⅜ inch screen, but be retained on a ¼ inch screen, at a different plant location. This slag was also the product of a blast furnace and was air-cooled.

This slag is interground with normal Portland clinker substantially of the same composition set forth in Example I in ration of 10 lbs. of air-cooled slag per 90 lbs. of clinker, with 5 lbs. straight gypsum rock included.

The comparative data between the product of this grind and a blank, made using only the Type I clinker and gypsum (100 parts of clinker to 5 parts of gypsum rock) is as follows:

| | Normal Type I | Improved Type I |
|---|---|---|
| Blaine, cm$^2$/g | 4080 | 4100 |
| −325 mesh | 90.7% | 91.9% |
| $SO_3$ | 3.50 | 3.35 |
| C-109 Strengths | | |
| 1-day, psi | 1100 | 1140 |
| 3-day, psi | 2920 | 3070 |
| 7-day, psi | 3480 | 3750 |
| 28-day, psi | 4920 | 5320 |

The usual additives, such as the gypsum materials described above, may be utilized in connection with the present invention, for example in ratio of about 2–10 parts by weight, when the slag and clinker are present in the parts by weight ranges mentioned heretofore.

To determine the extent of crystallinity of a given slag, various chemical and physical methods are available. For example, one may determine the extent of the glass phase present (and, hence, by subtraction, the crystalline phase) by following the methods described by Saburo Takashime and Kazuo Hijaki in their article, "Dissolution and Determination of Glass Phase in Portland Cement Clinker and Methanolic Solution of Picric Acid," Semento Gijutsu Nempo, 23, pp. 35–39 (1969); Chemical Abstracts 74, pp. 188, 1971. By this method, a sample of 0.5 gram of powdered clinker is treated with 30 ml. of methanol containing 4–9 grams of picric acid; another sample is treated with 30 ml. of methanol containing 2–9 grams salicylic acid. The former dissolves the free CaO, calcium silicates and glass phases and the latter dissolves the calcium silicates and free CaO. The samples were stirred for 5 hours, allowed to stand overnight, filtered, washed with methanol, dried and weighed. The difference in he weights of the residue corresponds to the amount of glass phase in the clinker. The crystal phase can be determined by simple subtraction.

Alternatively, x-ray defraction and microscopic technique may be used to provide analytical tools to determine one extent of crystal structure. Florescent techniques may also be utilizable to determine the relative degree of glassy phase and crystal phase.

It should be pointed out that the predictability of a given air-cooled slag for its utilization in cement is somewhat empirical in nature. In general, an efficacious slag is one which has been tried in actual practice and found to produce quite a good cement. If the structure of the slag is such that particle size distribution is within the appropriate range, it is believed that the slag tends to be more efficacious. Moreover, those slags having a chemical composition reasonably close to the one revealed herein are most generally found to be efficacious in nature. It is recognized that a certain degree of experimentation may be required in order to find the most effective air-cooled slag to produce a product having not only suitable properties for the intended use, but having properties of a nature equal to Type I, or as in the best cases, having properties superior in many regards to normal Type I. The present invention does not presuppose to predict that all air-cooled slags, whatever the composition, and whatever the size distribution, will work to produce a product that is as good as, or better than, usual Type I. It does demonstrate that air-cooled slags are usuable in making a satisfactory cement, and if a particularly suitable slag selection is made, that a cement may be obtained which is actually an improved Type I.

Having described the invention in connection with certain specific embodiments thereof, it is to be understood that further modifications may now suggest themselves to those skilled in the art and it is intended to cover such modifications as fall within the scope of the appended claims.

What is claimed is:

1. An efficacious cement consisting essentially of the grind obtained from the mixture of 1 up to 25 parts by weight of air-cooled iron blast furnace slag, and
    from over 75 up to 99 parts by weight of conventional Type I Portland clinker, and
    from 2 to about 10 parts by weight of set control additive.

2. The cement of claim 1 in which the air-cooled blast furnace slag is present in quantity from 5 to 15 parts by weight and in which the Portland clinker is present in quantity of from 85 to 95 parts by weight.

3. The cement of claim 1 in which the blast furnace slag is present in quantity of about 10 parts by weight and in which the Type I Portland clinker is present in quantity of about 90 parts by weight.

4. The cement of claim 1 in which the blast furnace slag comprises the following approximate composition:

| $SiO_2$ | — | 35.6 (% by wt.) |
|---|---|---|
| CaO | — | 39.0 |
| $Al_2O_3$ | — | 8.6 |
| $Fe_2O_3$ | — | 4.0 |
| MgO | — | 9.6. |

5. The cement of claim 2 in which the slag comprises the following approximate composition:

| $SiO_2$ | — | 35.6 (% by wt.) |
|---|---|---|
| CaO | — | 39.0 |
| $Al_2O_3$ | — | 8.6 |
| $Fe_2O_3$ | — | 4.0 |
| MgO | — | 9.6. |

6. The cement of claim 3, in which the slag comprises the following approximate composition:

| $SiO_2$ | — | 35.6 (% by wt.) |
|---|---|---|
| CaO | — | 39.0 |
| $Al_2O_3$ | — | 8.6 |
| $Fe_2O_3$ | — | 4.0 |
| MgO | — | 9.6. |

7. The method of making an improved Type I cement comprising intergrinding an efficacious air-cooled slag of a substantially crystalline structure in quantity from 1 to 25 parts by weight with a Type I clinker in quantity of over 75 up to 99 parts by weight.

8. The method of claim 7 in which the slag is present in quantity of from 5 to 15 parts by weight and in which the Type I clinker is present in quantity of from 85 to 95 parts by weight.

9. The method of claim 8 in which the slag, before intergrinding, is of a size such that it will pass through a ⅜ inch screen and be retained on a ¼ inch screen.

10. The method of claim 8 in which the slag comprises the following approximate composition:

| $SiO_2$ | — | 35.6 (% by wt.) |
|---|---|---|
| CaO | — | 39.0 |
| $Al_2O_3$ | — | 8.6 |
| $Fe_2O_3$ | — | 4.0 |
| MgO | — | 9.6. |

11. The method of claim 10 in which the slag, before intergrinding, is of a particle size that will be retained on a ¼ inch screen and pass through a ⅜ inch screen.

12. The cement of claim 1 in which the air-cool blast furnace slag has at least 50 percent by weight crystallinity.

13. The cement of claim 1 in which the set control additive is 60–40 gypsum/anhydrite blend.

* * * * *

UNITED STATES PATENT AND TRADEMARK OFFICE
CERTIFICATE OF CORRECTION

PATENT NO. : 4,047,961
DATED : September 13, 1977
INVENTOR(S) : William Eugene Alderete, et al.

It is certified that error appears in the above-identified patent and that said Letters Patent are hereby corrected as shown below:

Col. 2, line 6, "is" should be --its--;
       line 17, "balst" should be --blast--;
       line 26, "is" (first occurrence) should be --in--;

Col. 3, line 2, "9.5 inch x 34 inch" should be --9.5' x 34'--;
       line 5, "90 No." should be --90#--;
       line 6, "5 No." should be --5#--;
       line 7, "10 No." should be --10#--;
       line 8, "5 No." should be --5#--;

line 43, "5 No." should be --5#--;
       line 44, "100 No." should be --100#--.

Col. 4, line 45, "he" should be --the--;
       line 51, "one" should be --the--.

Signed and Sealed this

Seventh Day of February 1978

[SEAL]

Attest:

RUTH C. MASON
Attesting Officer

LUTRELLE F. PARKER
Acting Commissioner of Patents and Trademarks